Aug. 18, 1931. L. C. MYERS ET AL Re. 18,158

TYPEWRITING MACHINE

Original Filed Dec. 20, 1924 2 Sheets-Sheet 1

Inventors:
L. C. Myers and
G. F. Handley
by their Attorneys
Bracken & Wight

Aug. 18, 1931. L. C. MYERS ET AL Re. 18,158
TYPEWRITING MACHINE
Original Filed Dec. 20, 1924 2 Sheets-Sheet 2
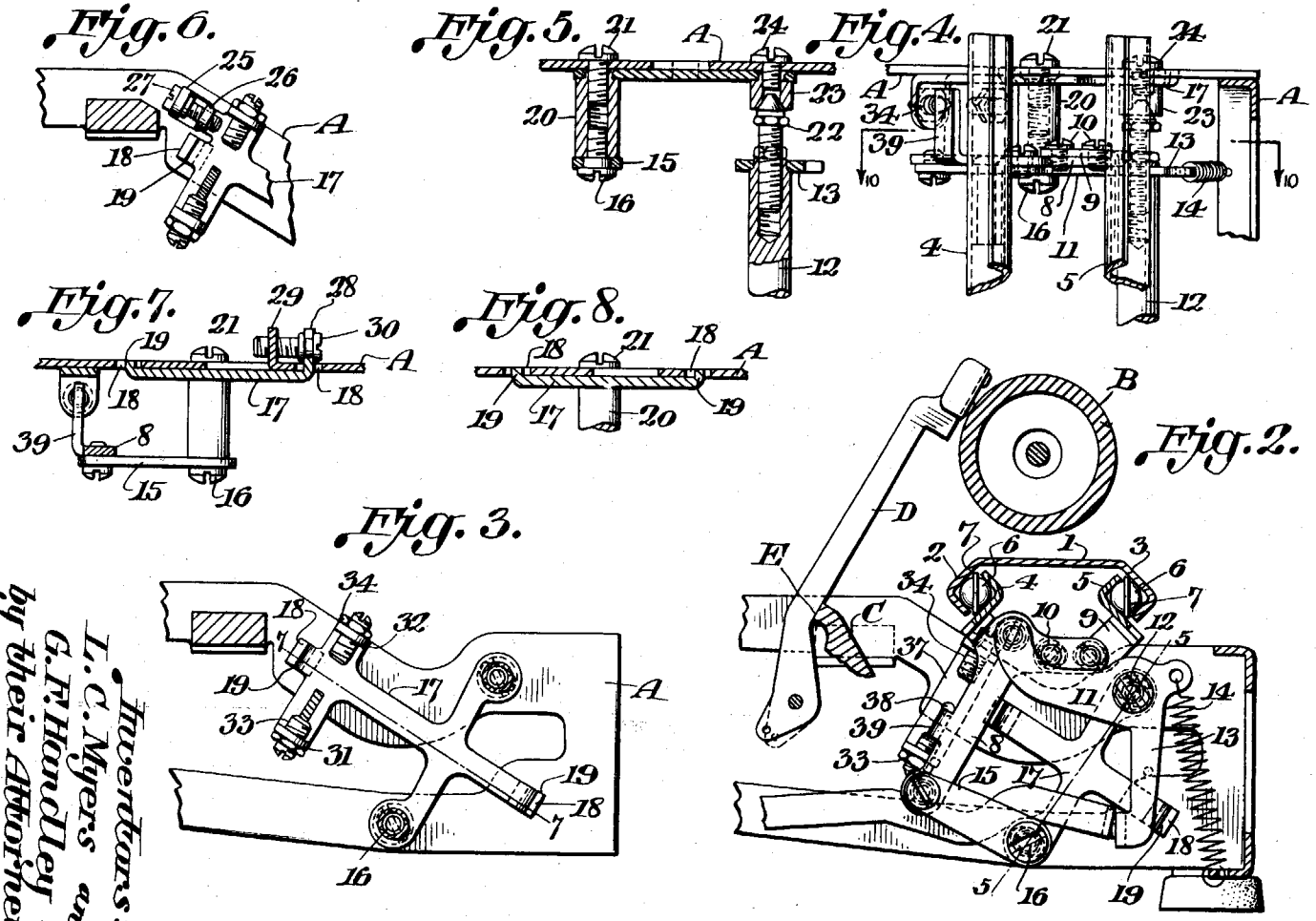
Inventors:
L. C. Myers and
G. F. Handley
by their Attorneys
Baldwin & Wight Reissued Aug. 18, 1931 Re. 18,158

UNITED STATES PATENT OFFICE

LEWIS C. MYERS, OF FREEPORT, AND GEORGE F. HANDLEY, OF GLENDALE, NEW YORK, ASSIGNORS TO ROYAL TYPEWRITER COMPANY, INC., OF NEW YORK, N. Y., A CORPORATION OF NEW YORK

TYPEWRITING MACHINE

Original No. 1,562,119, dated November 17, 1925, Serial No. 757,169, filed December 20, 1924. Application for reissue filed June 24, 1927. Serial No. 201,274.

This invention relates to a support for the entire shift frame which is made adjustable in the main frame in order that the position of the platen may be determined accurately with reference to the impression of the entire type face of the type bars. It is shown as applied to a small, portable machine of very compact construction, but many features of the invention are useful in other types of machines. The particular embodiment of the invention is especially advantageous in a machine wherein the type bars operate at an angle of approximately 30° to the vertical at the time of printing.

Patent to Hess and Myers, No. 1,417,902 of May 30, 1922, discloses a construction in which the shift frame is given a movement for adjustment. This construction, however, shows a carriage supported on a single rail for traveling movement and the adjusting movement is a pivotal one, being effected by the movement of an eccentric screw controlling one of the parallel links of the shift frame. Such an adjustment is not well adapted for the present type of machine in which the carriage travels upon two rails and in which the type bars and platen bear a different angular relation at the time of printing.

An object of the invention is to provide a support whereby the whole shift frame and its appurtenances is mounted in an auxiliary frame adjustably carried by the main frame of the machine.

Another object of the invention is to provide simple means for adjusting the auxiliary frame as a whole in a direction at right angles to the position of the type bar at the time of printing.

A further object of the invention is to provide means for obtaining a fine adjustment of this character and holding the parts in adjusted position.

Another object of the invention is to provide means for mounting the rail which serves as an axis for the shift frame in such manner that it may have adjustment with the remainder of the shift frame without interfering with its necessary pivotal movement whenever the frame is moved by the operation of the shift key.

A still further object of the invention is to provide simple and efficient means for adjusting the position of one rail of the shift frame with relation to the other.

Other objects of the invention will be apparent from the following detailed description and appended claims.

In the drawings:

Figure 2 is a similar section with parts in elevation showing the mounting of the shift frame.

Figure 3 is a similar view showing one of the side plates with its relation to the main frame and also a slight modification.

Figure 4 is a top plan view of the carriage tracks and shift frame at one side of the machine.

Figure 5 is a section taken substantially on the line 5—5 of Figure 2.

Figure 6 is a fragmentary detail showing one form of the means for obtaining a fine adjustment of the shift frame.

Figure 7 is a section substantially on the line 7—7 of Figure 3 showing a modified form of adjustment.

Figure 8 is a similar section showing the sliding relation of the plate to the main frame when no means is employed for obtaining the fine adjustment.

Figure 1:
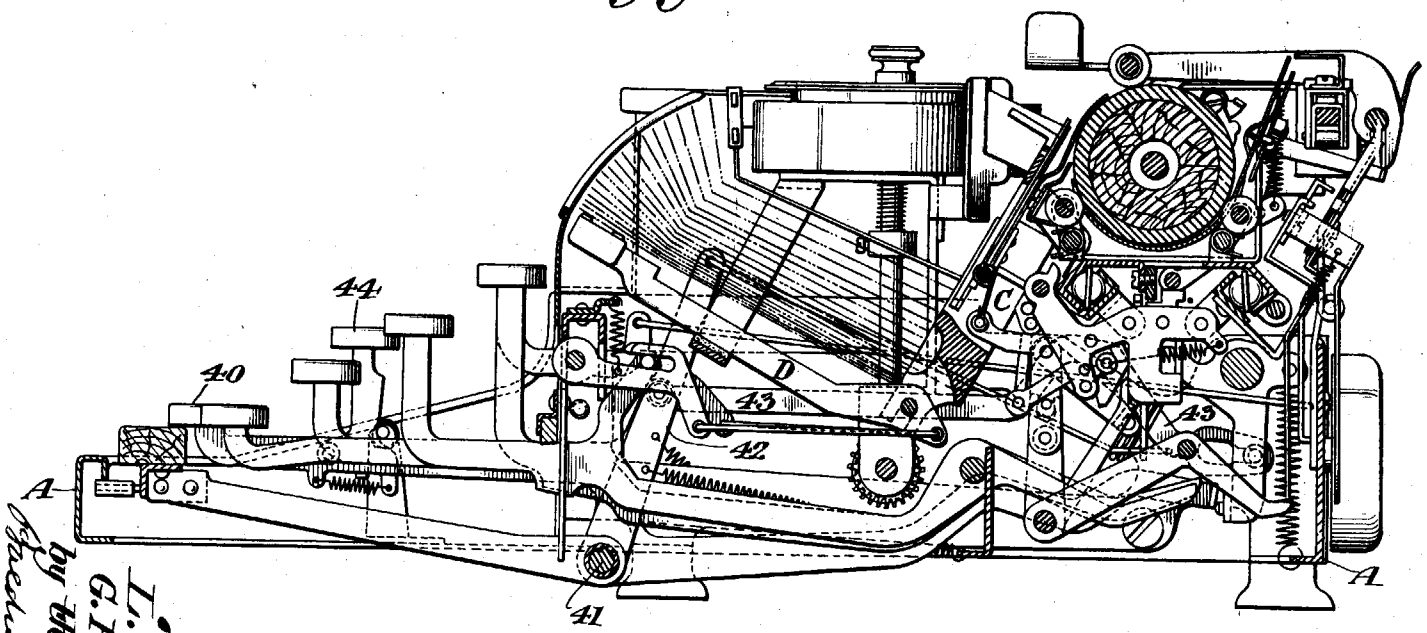
Figure 1 is a vertical fore and aft section with parts in elevation of a typewriting machine embodying our invention.
Figure 10:
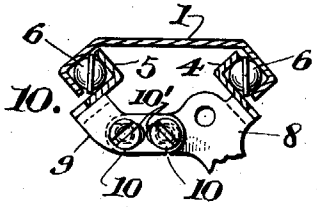
Figure 10 is a section on the line 10—10 of Figure 4.

The invention is disclosed as illustrated in a typwriting machine having a frame A, platen B, a segment C, type bars D, and the other usual instrumentalities. Except as hereinafter noted these may be of any usual or desired type. The segment C is provided with an abutment E against which the type bars strike when at printing position and which limits their movement toward the platen. When in printing position they operate at an angle of approximately 30° to the vertical as shown in Figure 2.

The platen is supported in a carriage comprising a lower member 1 having track elements 2 and 3 which cooperate with track elements 4 and 5 on the shifting frame by means of balls 6 which are spaced by spanners 7 in the usual manner. The rail or track element 4 is rigidly mounted while the rail or track element 5 is adjustable horizontally to provide means for properly assembling the device and to enable any inaccuracies of manufacture to be easily overcome. A supporting arm 8 is rigidly secured to the front rail 4 and adjustably secured to this arm by screws 10 passing through slots 10′ is a tie plate 9. This tie plate carries the rear rail 5.

It is to be understood that this mechanism is duplicated at each side of the machine and the same is true of the mounting of the shift frame hereinafter set forth. In order to obtain simplicity and clearness of description only one side of the machine is usually referred to.

Rocker arms 11 are connected at their forward ends to the rail structure just described and are secured at their rear ends to a shaft 12 which at one side of the machine has a depending arm 13 which is operated through mechanism not herein described in detail for the purpose of shifting the carriage for case shift movement. A counterbalance spring 14 attached to the shifting arms and to the frame of the machine serves to assist the shifting movement.

To the lower end of the arm 8 is pivoted a link 15 which is substantially parallel to the arm 11 and the other end of this link is pivoted by a screw 16 to the plate 17. This parallel link movement is for the purpose of giving the shift frame and platen their proper movement when shifted for upper case characters.

Since the type bars are limited in their movement toward the platen, it is necessary to accurately position the carriage in order that the type imprints shall be clear. Also since the type bars stand at an angle of about 30° to the vertical when at printing point, this adjustment should be in a right line and substantially perpendicular to the type bars when at printing point. This adjustment is obtained by means about to be described.

The plate 17 is mounted to slide in a line perpendicular to the type bars when at printing position and is held in proper relation to the frame of the machine by means of openings 18 in the machine frame A through which pass ears 19 offset from said plate. The plate 17 is held in its adjusted position by mechanism particularly shown in Figures 4 and 5. The screw 16 threads into a stud 20, the end of which fits into the plate 17. A screw 21 passes through a short slot in the main frame A and threads into the stud 20. The rock shaft 12 has a cone bearing 22 threaded into the end thereof and this cone bears in the correspondingly shaped end of a short hollow stud 23 which also fits into plate 17. A screw 24, similar to the screw 21 in its form and mounting, passes through the machine frame A into the stud 23.

It is evident from this description that the whole shift frame, including the rock shaft 12 and the parallel link construction, is supported by the plates 17 and that these plates with the structure supported thereby can be adjusted with reference to the main frame of the machine and are held in the desired adjusted position by tightening the screws 21 and 24. In the form shown in Figure 2 there is no particular means for moving the plates 17 to the desired position. After the screws 21 and 24 are loosened, these plates may be moved manually in any manner as by inserting the end of a screw driver in one of the slots 18 and giving the plates the desired movement. When located in the desired position, the screws 21 and 24 are again tightened. In some cases, particularly in larger machines, it may be desirable to be able to obtain a more fine adjustment of the position of the plates 17 and the mechanism supported thereby. Such an adjustment may be obtained in various manners, two forms of such mechanisms being shown in Figures 6 and 7.

In the form shown in Figure 6, this result is obtained by providing the frame A with an ear 25 and the plate 17 with an ear 26. A screw 27 is mounted in the ear 25 for free rotation therein but is held against longitudinal movement and is threaded into the ear 26. In the modification shown in Figure 7, one of the ears 19 of the plate 17 is extended at 28 and the frame A has an ear 29 struck up therefrom. A screw 30 is mounted in the ear 28 to rotate but is held against longitudinal movement and is threaded into the screw 29.

Figure 9:
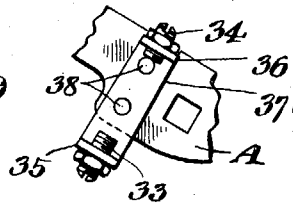
Figure 9 is a detail view showing more clearly the arrangement of the stops for limiting the shift movement in the form illustrated in Figure 2.

We have also illustrated means for limiting the shifting movement of the shift frame in both directions. In Figure 3 such means is shown comprising ears 31 and 32 struck up from the plate 17 and carrying stop screws 33 and 34. In the form of the construction illustrated in Figures 2, 4 and 9 the screws 33 and 34 are carried by ears 35 and 36 respectively struck up from a plate 37 supported by rivets 38 to the side frame A of the machine. In either case an ear 39 of the member 8 extends into position to engage the stop screws at the limit of the shifting movement in either direction.

A shift key 40 is located at each side of the key board and these shift keys are secured to a pivotally mounted rock shaft 41 which has an upwardly extending arm 42 attached to a rearwardly extending link 43. This link is connected to the arm 13 below its pivotal center so that a depression of the shift keys will operate to move the shift frame and platen to upper case position. A shift lock key is shown at 44.

It will, therefore, be seen that the invention comprises simple, compact and efficient means for attaining the objects of the invention previously recited. It is obvious that various detail changes may be made in the precise form and arrangement and that parts of the invention may be employed alone or in other relations without in any way departing from the spirit of the invention. It is, therefore, to be considered that the invention is limited only by the scope of the appended claims.

We claim as our invention.

1. In a typewriting machine embodying a main frame and a shift frame having a pivotal movement for case shift purposes, the combination of a rock shaft for obtaining said movement, a cone bearing for each end of said rock shaft, studs receiving said cone bearings, and adjustable members supporting said studs.

2. In a typewriting machine embodying a main frame and a shift frame having a pivotal movement for case shift purposes, the combination of a rock shaft for obtaining said movement, an adjustable cone bearing for each end of said rock shaft, studs receiving said cone bearings, and adjustable members supporting said studs.

3. In a typewriting machine embodying a main frame and a shift frame having a pivotal movement for case shift purposes, the combination of a rock shaft for obtaining said movement, a cone bearing for each end of said rock shaft, studs receiving said cone bearings, adjustable members supporting said studs, and means for adjusting said members relative to the main frame.

4. In a typewriting machine embodying a carriage, the combination of two rails on the carriage, a shift frame entirely supporting the carriage, two cooperating rails thereon, a member extending from each of the rails on the shift frame toward its companion rail, and means adjustably connecting said members to permit the adjustment of one of said rails relative to the other.

5. In a typewriting machine, the combination with a main frame including side plates respectively formed with alined guide slots, of a carriage including a platen, type bars disposed in front of said platen, a shift frame supporting the carriage, a pair of supporting plates on which the shift frame is mounted and having guide ears extending laterally into said guide slots whereby said supporting plates, shift frame, and carriage, may be adjusted as a unit towards and from said type arms, and separate means for retaining said plates in adjusted positions.

6. In a typewriting machine, the combination with a main frame including side plates respectively formed with alined guide slots, of a carriage including a platen, type bars disposed in front of said platen, a shift frame supporting the carriage, a pair of supporting plates on which the shift frame is mounted and having guide ears extending laterally into said guide slots whereby said supporting plates, shift frame, and carriage may be adjusted as a unit towards and from said type arms, and means for adjusting said supporting plates along said slots comprising ears extending outwardly from the side plates of the main frame, and screws respectively engaging one of the guide ears of the supporting frame and the associated ear of the side plate.

7. In a typewriting machine, the combination with a main frame including side plates respectively formed with alined guide slots, of a carriage including a platen, type bars disposed in front of said platen, a shift frame supporting the carriage, a pair of supporting plates on which the shift frame is mounted and having guide ears extending laterally into said guide slots whereby said supporting plates, shift frame, and carriage may be adjusted as a unit towards and from said type arms, means for adjusting said supporting plates along said slots comprising ears extending outwardly from the side plates of the main frame, and screws respectively engaging one of the guide ears of the supporting frame and the associated ear of the side plate, and separate means for retaining said plates in adjusted positions.

In testimony whereof, we have hereunto subscribed our names.

LEWIS C. MYERS.
GEORGE F. HANDLEY.